June 28, 1966 H. HODKINSON 3,258,090
DISC BRAKES
Filed June 12, 1964 2 Sheets-Sheet 1

United States Patent Office 3,258,090
Patented June 28, 1966

3,258,090
DISC BRAKES
Harold Hodkinson, Finham, near Coventry, England, assignor to Dunlop Rubber Company Limited, Birmingham, England, a corporation of Great Britain
Filed June 12, 1964, Ser. No. 374,733
Claims priority, application Great Britain, June 19, 1963, 24,307/63
5 Claims. (Cl. 188—73)

This invention relates to disc brakes of the kind in which the friction elements are supported on opposite sides of a brake disc by an axially movable caliper-type housing and the other friction element is movable toward and away from the first element by a brake-applying mechanism fixed to the housing; the housing serving to transmit the reaction of the brake-applying mechanism to press the first friction element against the disc simultaneously with the movable friction element.

According to the present invention a disc brake comprises a rotatable disc, a nonrotatable support member, a caliper-type housing mounted on the support member and movable axially relative to the disc, and a stabilizing device in the form of an arm rigidly secured at one end to the support member and adjustably attached at its other end to the caliper-type housing.

Preferably the caliper-type housing is mounted on the support by means of a pair of parallel links each of which is pivotally attached at opposite ends to the support and to the housing.

The present invention will now be described with reference to the accompanying drawings of which:

Figure 1:
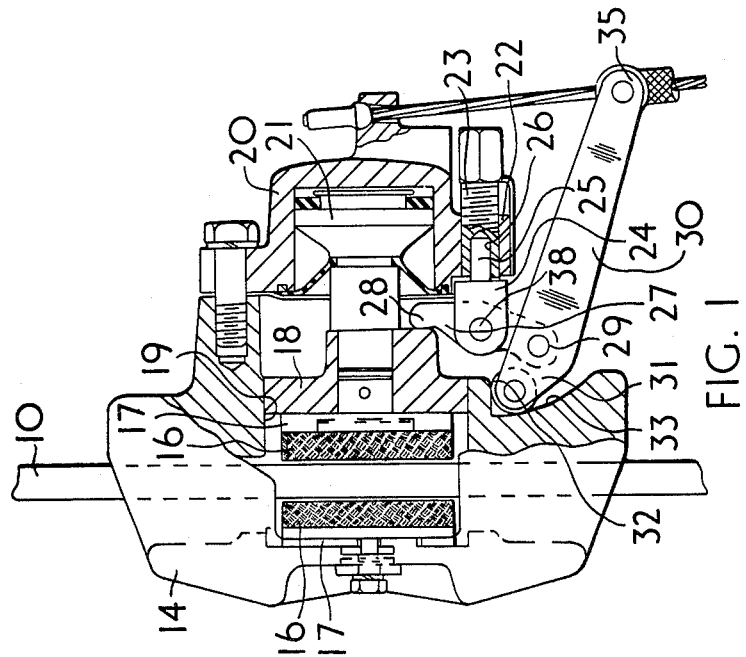
FIGURE 1 is a plan view partly in cross-section of a disc brake incorporating a stabilizing device according to the present invention.
Figure 2:
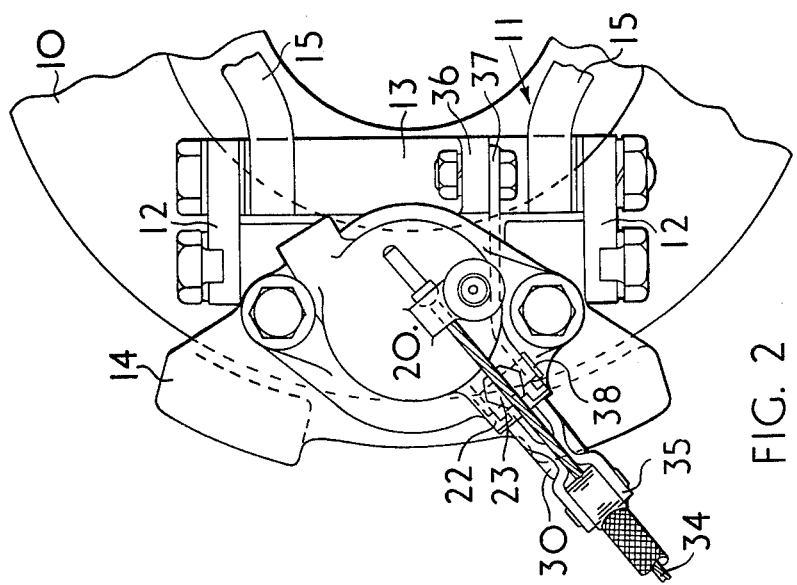
FIGURE 2 is a side elevation of the disc brake illustrated in FIGURE 1.
Figure 4:
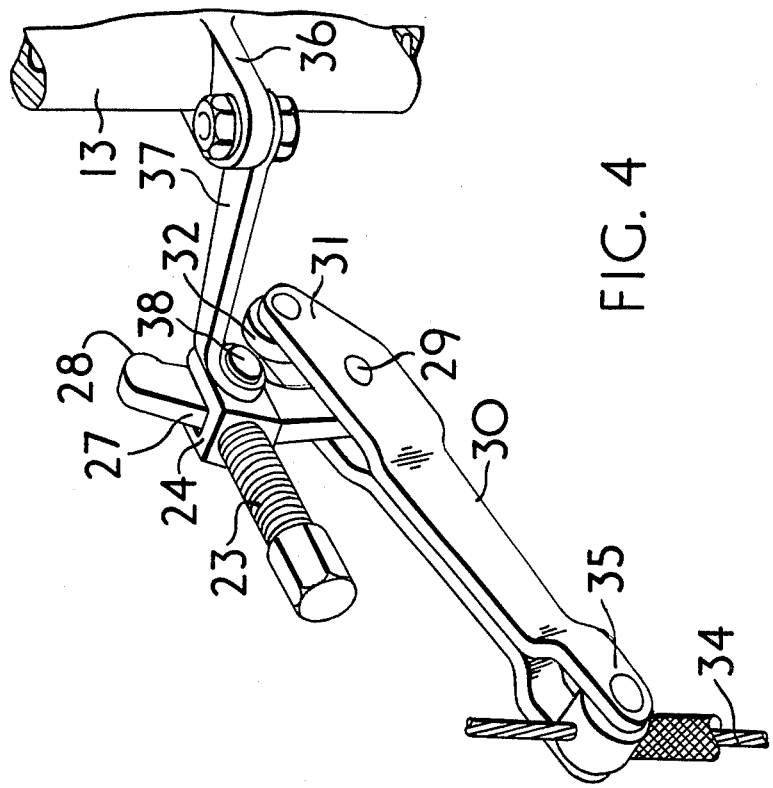
FIGURE 4 shows the mechanical actuating mechanism and the stabilizing device in isolation.
Figure 3:
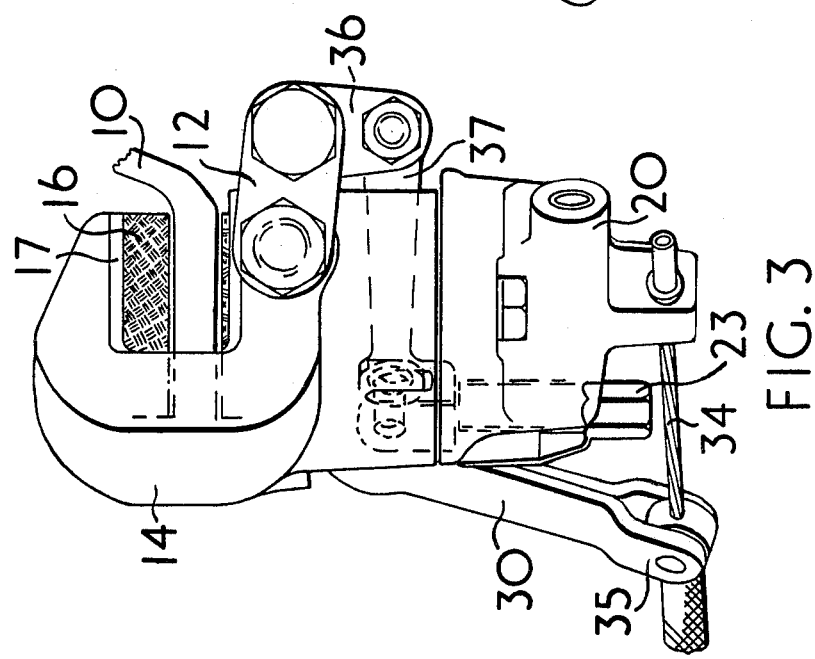
FIGURE 3 is an end elevation of the disc brake illustrated in FIGURE 1.

In one embodiment of the invention, as applied to a brake for a motor vehicle, a disc 10 is rigidly secured to the hub of a wheel (not illustrated) to be braked, and a support member 11 is secured adjacent one side of the disc 10 to a nonrotatable portion of the vehicle. The support member 11 comprises a pair of spaced ears 15 which extend from the nonrotatable portion of the vehicle and a tubular torque-taking member 13 rigidly secured to the ears 15 and extending parallel to a chord of the disc 10. A pair of spaced links 12 are pivotally attached one to each end of said tubular torque-taking member 13 and extend parallel to a radius of the disc 10.

A caliper-type housing 14 is mounted between the two links 12 in such a manner that it is capable of moving bodily in a direction parallel to the axis of the disc 10 without tilting. The housing 14 straddles the outer periphery of the disc 10 and covers a minor portion only of the braking surface thereof.

A friction element, comprising a pad of friction material 16 attached to a backing plate 17, is provided adjacent each braking surface of the disc 10, the friction element on the side of the disc 10 remote from the support member 11 being detachably secured to the housing while the friction element on the same side of the disc 10 as the support member 11 is attached to a thrust plate 18, which is slidable toward and away from the disc 10 in an aperture 19 in the housing 14. The edges of the thrust plate 18 engage the aperture 19 so that the braking torque is readily transferred to the housing 14.

A brake actuating cylinder 20 is detachably secured to the housing 14 on the same side of the disc as the support member and a piston 21 fluid-tightly slidable within the cylinder 20 is adapted to engage the thrust plate 18 to urge it, together with the associated friction element, toward the braking surface of the disc 10.

Under normal operating conditions fluid under pressure is introduced into the brake actuating cylinder 20 from a master cylinder or the like (not illustrated) to force the slidable friction element into engagement with the adjacent braking surface of the disc 10. The resulting reaction forces set up on the cylinder 20 move the housing 14 axially with respect to the disc 10 to bring the friction pad 16 fixed to the opposite side of the housing into engagement with the disc to effect full engagement of the brake.

The brake operating cylinder 20 is provided on the outer surface thereof with a lug 22 which is bored and tapped to threadedly receive an adjustment bolt 23 extending parallel to the axis of the disc 10. Located at the end of this adjustment bolt 23 adjacent the thrust plate 18 is a bifurcated member 24 which is provided with a spigot 25 located in a central blind bore 26 of the adjustment bolt 23. The bolt 23 can thus rotate relative to the spigot 25 without disturbing the angular position of the member 24 relative to the axis of the disc 10.

A pressure applying lever 27 is fulcrumed intermediate its ends to the bifurcated member 24. One end 28 of said lever is adapted to bear against the thrust plate 18 on the side thereof remote from the disc 10 while the other end 29 forms the fulcrum for an operating lever 30. The extreme end 31 of said operating lever 30 is provided with a roller 32 which engages a cam surface 33 formed on the caliper-type housing. The operating lever 30 is arranged to be actuated by a cable mechanism 34 connected to the end 35 of the operating lever remote from the roller 32.

The tubular torque-taking support member 13 is provided with a bracket 36, extending substantially parallel to the axis of the disc 10, to which is rigidly bolted a stabilizing arm 37.

This stabilizing arm 37 extends substantially parallel to the braking surface of the disc 10 to engage the bifurcated member 24 and is secured thereto by means of a pivot pin 38 passing through the stabilizing arm 37 and the bifurcated member 24.

This arrangement of levers provides for mechanical actuation of the brake, in addition to the fluid pressure mechanism, in the following manner.

Actuation of the cable mechanism 34 causes the operating lever 30 to pivot about its fulcrum 29 and the roller 32 to ride up the cam surface 33. This movement in turn pivots the pressure applying lever 27 about its fulcrum 38 to move the thrust plate 18 together with its associated friction element into engagement with the disc. Reaction on the fulcrum 38 causes the housing 14 to move axially to bring the other friction element into engagement with the opposite braking surface of the disc 10.

As wear of the friction material 16 takes place the movement of the fluid pressure operated piston 21 or mechanically actuated lever 30 will have to be increased in order to bring the friction material 16 into full engagement with the braking surface of the disc 10. This movement can be reduced to its original value by rotating the adjustment bolt 23 either manually or by mechanical means associated with the operating lever 30 and responsive to the increased movement of said lever. It will be seen that rotation of the adjustment bolt 23 in the appropriate direction applies a thrust to the end of the stabilizing arm 37 which tends to urge it towards the disc 10. As previously explained the stabilizing arm 37 is secured to the support member 11 and is therefore locked in a constant position relative to the disc 10 at all times. Therefore the thrust applied to the stabilizing arm 37 by rotating the adjustment bolt 23 reacts upon the housing 14 to move it in an axial direction relative to the disc 10 to draw the friction element secured to the housing 14 towards the adjacent braking surface of the disc 10. The movement of the housing 14 also pivots the pressure-applying lever 27 to a new inoperative position and thereby limits the amount that the thrust plate 18 can move away from the disc 10.

In addition to forming an important part of the adjustment device the stabilizing arm 37 also acts to locate the housing 14 and prevent any undue axial movement when the brake is in the released condition. This will prevent the friction material 16 from bouncing against the adjacent braking surface of the disc 10 when the vehicle is negotiating a bend in the road or traversing rough ground.

In order that the break may function satisfactorily between adjustments it may be necessary to provide certain amount of flexibility in the connection of the stabilizing arm to the bifurcated member. This flexibility can be provided by using a rubber bushing or other resilient means for locating the pivot pin 38 in a slot in either the bifurcated member or stabilizing arm. Alternatively the arm 37 can be arranged to flex slightly under axial load.

The cam surface along which the roller of the operating lever is adapted to move may be arranged so that the operating ratio increases with an increase in travel of the lever from a ratio of 10:1 up to a ratio of 30:1.

The operating cylinder and piston may be provided with an automatic retraction mechanism of the type described in the specification of British Patent No. 850,649.

While the present invention has been illustrated and described in connection with certain selected embodiments it will be understood that these are illustrative of the invention and by no means restrictive thereof. It is reasonably to be expected that those skilled in this art can make numerous revisions and adaptations of the invention which will be included within the scope of the following claims as equivalents thereof.

Having now described my invention what I claim is:

1. In a disc brake including a rotatable disc, a nonrotatable support member, a caliper-type housing mounted on said support member and movable axially relatively thereto, a stabilizing device constructed as an arm secured at one end to said support member, and having adjuster means for connecting its other end to said housing, a pair of links forming pivot connections between said support member and said housing, a first friction element adapted to engage one braking surface of said disc and secured to said housing and a second friction element slidably mounted within an opening in said housing for movement toward and away from said disc, an actuating mechanism acting between said housing and second friction element and including a first mechanically operated lever, means forming an adjustable fulcrum between said first lever at the mid-point thereof and said housing, said lever having one end which acts against said second friction element and further including a portion which operatively thrusts against said housing and a second mechanically operated lever pivotably joined to said first lever, and a thrust connection between said housing and said second operating lever.

2. The disk brake in accordance with claim 1 wherein the fulcrum includes a pivot pin forming a pivot mounting between said stabilizing device and said housing.

3. A disc brake in accordance with claim 2 including a bifurcated member serving as a mounting for said first mechanically actuated lever and disposed between said first mechanically actuated lever and said housing.

4. A disc brake comprising a rotatable disc, a nonrotatable support member, a caliper-type housing mounted on the support member and movable axially relative to the disc, a stabilising device constructed as an arm secured at one end to the support member and having means adjustably attaching such arm at its other end to the housing, a first friction element secured to the housing and arranged to engage one braking surface of the disc, and a second friction element mounted in the housing and movable axially relative to the housing to engage the other braking surface of the disc, and an actuating mechanism associated with the movable friction element, said actuating mechanism comprising a pressure lever fulcrumed intermediate its ends on the end of said arm, one end of said pressure lever being arranged to apply pressure to the movable friction element and the fulcrum of said pressure lever being arranged to apply an equal and opposite pressure to the housing, the actuating mechanism further comprising means for rotating said pressure lever about its fulcrum to apply the brakes.

5. A disc brake according to claim 4 in which the means for rotating the pressure lever about its fulcrum to apply the brake comprises an operating lever pivoted intermediate its ends on said other end of the pressure lever and having at one end a roller arranged to engage a cam surface formed on the caliper-type housing to move along said cam surface upon angular movement of the operating lever, the other end of said operating lever being movable to effect rotation of said pressure lever.

References Cited by the Examiner

UNITED STATES PATENTS

| 3,090,468 | 5/1963 | Rucker | 188—73 |
| 3,166,156 | 1/1965 | Burnett et al. | 188—73 |

FOREIGN PATENTS

| 1,129,639 | 9/1956 | France. |
| 1,286,818 | 1/1962 | France. |
| 1,060,672 | 7/1959 | Germany. |

MILTON BUCHLER, *Primary Examiner.*

G. E. A. HALVOSA, *Assistant Examiner.*